C. R. FAIREY.
CONTROLLING DEVICE FOR AEROPLANES.
APPLICATION FILED APR. 23, 1919.
1,350,145.  
Patented Aug. 17, 1920.  
3 SHEETS—SHEET 1.
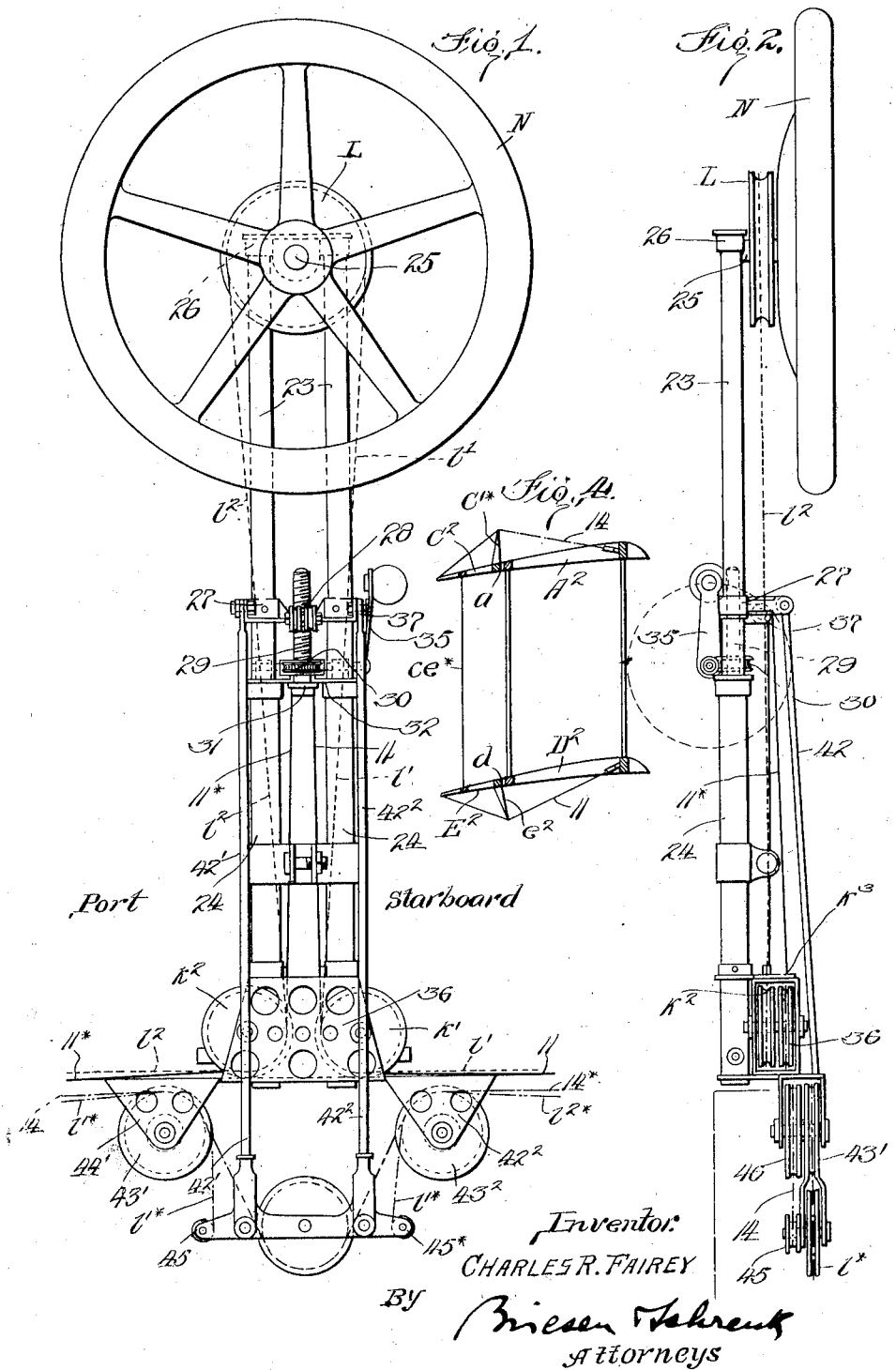
Inventor:  
CHARLES R. FAIREY  
By  
Attorneys

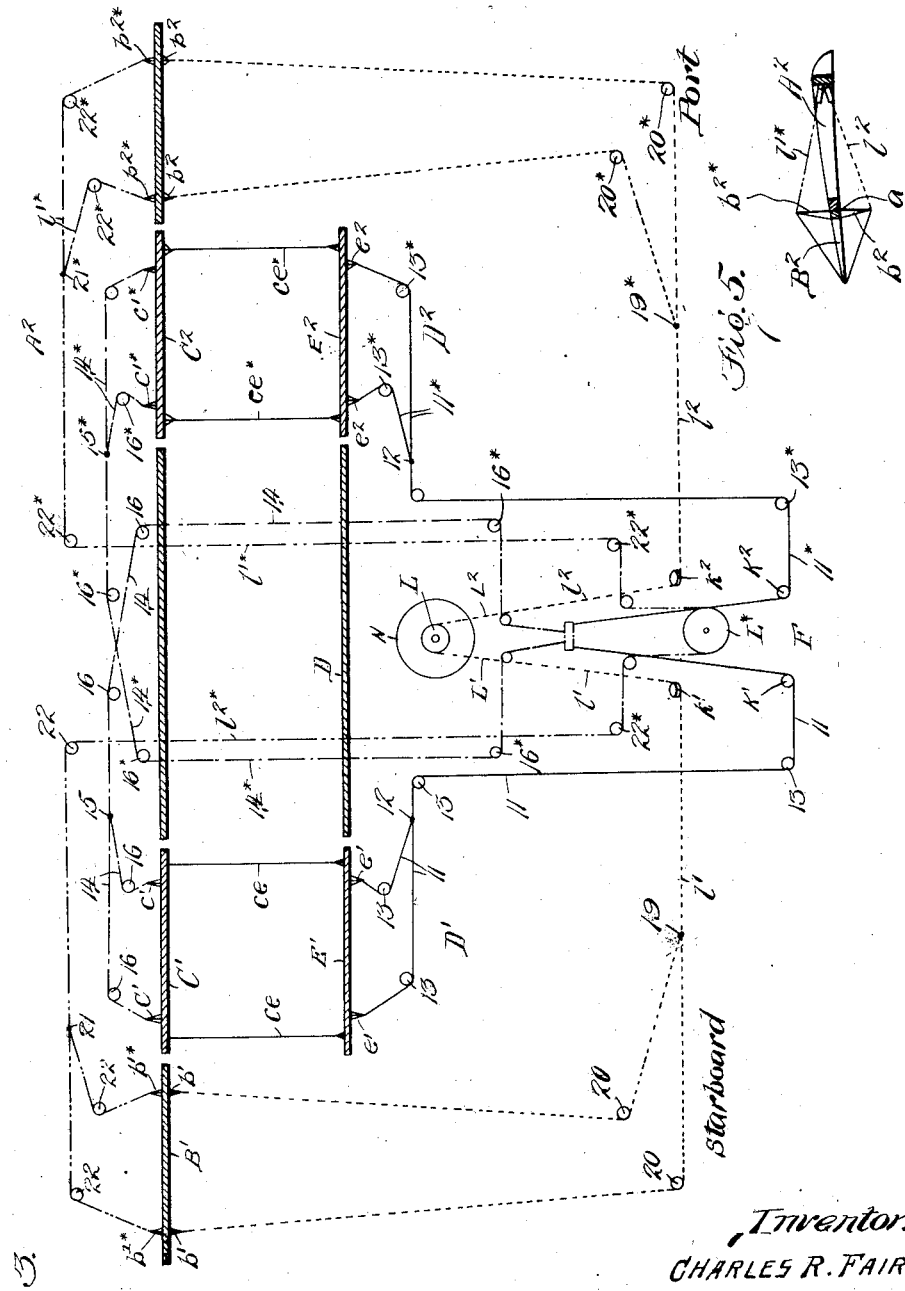

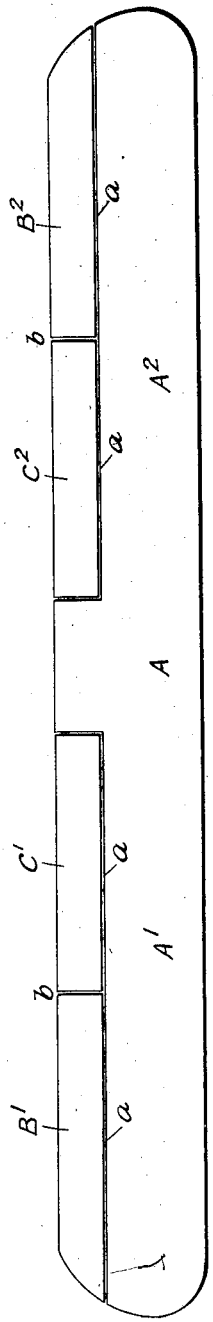
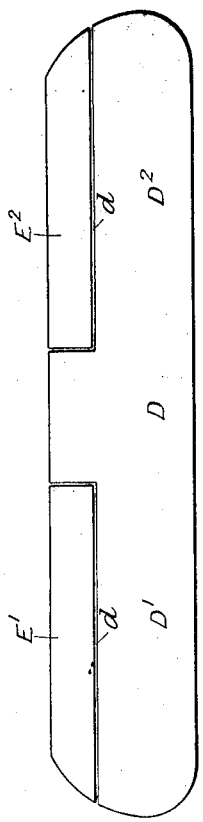

UNITED STATES PATENT OFFICE.

CHARLES RICHARD FAIREY, OF HAYES, ENGLAND.

CONTROLLING DEVICE FOR AEROPLANES.

1,350,145.   Specification of Letters Patent.   Patented Aug. 17, 1920.

Application filed April 23, 1919.   Serial No. 292,168.

*To all whom it may concern:*

Be it known that I, CHARLES RICHARD FAIREY, a subject of the King of Great Britain, and formerly resident of Clayton Road, Hayes, in the county of Middlesex, England, but now of Cranford Lane, Hayes, in the county of Middlesex, England, have invented a certain new and useful Improvement in and Relating to Controlling Devices for Aeroplanes, of which the following is a specification.

This invention relates to aeroplanes whereof the wings have trailing marginal portions, of variable inclination, respectively provided with control cables and with mechanism for so actuating the same as to cause the cambers of the respective wings to be varied simultaneously either in reverse directions or in the same direction, at will, by positive action transmitted through a closed mechanical circuit, and the invention has for its primary object to provide improved means for maintaining the efficiency of the mechanical circuit when the cambers of the respective wings are varied simultaneously in the same direction. For convenience of description the term "control cable" is used in this specification to designate a member which acts in opposition to the wind pressure during flight to control the position of a movable trailing marginal portion, and the term "balance wire" is used to designate a member which acts in opposition to a control cable to insure positive control of the trailing marginal portion. The term "closed mechanical circuit" is used to define an arrangement of mechanical connections between the operating and operated elements which assures positive control in both directions. In the mechanical circuit shown each aileron or flap is controlled by tension members (a control cable and a balance wire) acting in opposition to each other and always maintained taut to positively control the aileron or flap in both directions. The invention is particularly applicable in connection with the means, set forth in the specifications accompanying my applications for U. S. Letters Patent Serial Nos. 292,164, 292,165 and 292,166, all filed April 23, 1919, for varying the cambers of both wings simultaneously in the same direction without interfering with the capability of varying the cambers of the respective wings simultaneously in reverse directions, whether the whole or only a part of the length of the trailing marginal portions of the wings be variable, or whether said trailing marginal portions be variable as set forth in the specification accompanying my application for U. S. Letters Patent, Serial No. 292,167 filed April 23, 1919. The means just referred to involve leading the respective control cables, which extend in opposite directions from a rotatable drum, around guide-pulleys in such manner that an increase or a decrease in the distance separating the center of the drum from the centers of the guide-pulleys, or in the distance separating the centers of certain of the guide-pulleys, will result in both control cables being equally drawn upon or equally relaxed, while rotation of the drum will cause the one control cable to be drawn upon and the other to be relaxed, or vice versa. The present invention enables such means to be employed in combination with what is known as "balance wire" mechanism serving to complete the mechanical circuit between the trailing marginal portions of the respective wings in such manner that when the trailing marginal portion of either wing is pulled down by its control cable, the trailing marginal portion of the other wing is pulled up by the balance wire; for which purpose, according to the invention, not only the control cables but also the balance wires appertaining to the trailing marginal portions of the respective wings are led around guide-pulleys the distance separating the centers of which is variable so as to relax or draw upon the balance wires according as the control cables are drawn upon or relaxed, the balance wires performing their usual function when the cambers of the respective wings are varied simultaneously in reverse directions.

Somewhat similar means have already been proposed in connection with an aeroplane wherein not the trailing but the leading marginal portions of the respective wings are capable of having their inclination varied simultaneously either in reverse directions or in the same direction, at will, by positive action transmitted through a closed mechanical circuit.

One form of the present invention is adapted to be applied to an aeroplane provided with a controlling device having a manually-rotatable drum upon which are wound, from opposite directions, the control cables appertaining to the trailing marginal portions of the respective wings, said drum being mounted upon a control-pillar whereof the effective length is variable at will; rotation of the drum causing the camber of one wing to be increased and the camber of the opposite wing to be reduced, whereas alteration in the effective length of the control-pillar will cause the cambers of both wings to be simultaneously altered in the one direction or the other according as the pillar is lengthened or shortened. For this purpose the balance wires appertaining to the respective trailing marginal portions of the wings are respectively led around a pair of guide pulleys rotatably mounted on the fixed portion of the control-pillar and, from opposite directions, around a single guide-pulley carried by the movable portion of said control-pillar in such position relatively to the pair of guide-pulleys that when the effective length of the control-pillar is increased the distance separating the centers of the pair of guide-pulleys from the center of the single guide-pulley is decreased and vice versa. That is to say, if the effective length of the control-pillar is increased by upward movement of that portion which carries the drum whereon are wound the control cables, the single guide-pulley is rotatably mounted on said portion of the pillar or on an arm carried thereby below the level of the pair of guide-pulleys which are rotatably mounted on the fixed portion of the control-pillar, so that said upward movement which serves to increase the effective length of the control-pillar simultaneously decreases the distance separating the center of the single guide-pulley from the centers of the pair of guide-pulleys, thus relaxing the balance wires to the same extent as the control cables are taken up. Inasmuch as the balance wires are not led around the drum, they only perform their usual function when said drum is rotated to vary the cambers of the respective wings simultaneously in reverse directions.

The invention will be described with reference to the accompanying drawings, which illustrate diagrammatically an embodiment of the invention as applied to a sea-biplane wherein the wings of the upper plane are extended laterally beyond those of the lower plane, and wherein the trailing marginal portion of each wing of the upper plane is divided into two parts; the inclinations of those parts which are adjacent to the tips of the respective wings of said plane being variable simultaneously either in the same direction or in reverse directions, at will, and the inclinations of those parts which are remote from the tips being variable simultaneously in the same direction and concurrently with the similar variation in the inclinations of those parts which are adjacent to the tips, as set forth in the specification accompanying my application for U. S. Letters Patent Serial No. 292,167; while the trailing marginal portion of each wing of the lower plane is undivided and the inclinations of said portion of both wings are variable simultaneously in the same direction only, and concurrently with the similar variation in the inclinations of the trailing marginal portions of the upper plane.

In the drawings, all of which are diagrammatic,

Figure 1 is a rear elevation of a telescopic control pillar embodying the invention;

Fig. 2 is a side elevation of the same;

Fig. 3 is an elementary diagrammatic view showing the control cables for the flaps of the upper and lower planes in full lines, the control cables for the ailerons of the upper plane in dotted lines, the balance wires for the flaps in dash and single dot lines, and the balance wires for the ailerons in dash and double dot lines;

Fig. 4 is a vertical fore and aft section through both planes of one wing of the machine;

Fig. 5 is a similar section through the upper plane and its aileron adjacent one end;

Fig. 6 is an elementary plan view showing the upper plane of the machine, with flaps and ailerons; and Fig. 7 is a similar plan view showing the lower plane of the machine.

In the example illustrated, each wing $A^1$ and $A^2$ of the upper plane A of the machine has the entire length of its trailing marginal portion hinged at $a$ to the rigid main portion of the wing, and each such hinged portion is divided, at a point $b$ near the center of its length, into two parts whereof that part $B^1$ or $B^2$ which is toward the outer end of the wing constitutes an aileron (properly so called) for use in controlling the lateral stability of the machine as well as in varying the camber of the wing as a whole, whereas that part $C^1$ or $C^2$ which is toward the center of the machine constitutes what will, for the sake of distinction, be hereinafter termed a "flap", employed solely (in conjunction with the corresponding aileron) in varying the camber of the wing as a whole. The lower plane D of the machine has no ailerons properly so called; that is to say each wing $D^1$ and $D^2$ of this lower plane extends, transversely of the machine, only a short distance beyond the outer extremity of the flap $C^1$ or $C^2$ of the upper plane and has practically the entire length of its trailing marginal portion $E^1$ or $E^2$ hinged at $d$ to the rigid main portion of the wing, each such flap being employed solely (in conjunction with the flap and aileron of the corresponding upper wing) in varying the camber of the wing as a whole.

By the present invention the several flaps and ailerons, in whichever direction (i. e. downward or upward) they may be moved about their respective hinges, are actuated positively by manual power; all the flaps $C^1$, $C^2$ and $E^1$, $E^2$ being movable simultaneously in the same direction, downward or upward, whereas the ailerons $B^1$, $B^2$ are movable simultaneously either in the same direction as the flaps, or in directions opposite to one another independently of the movement (if any) of the flaps, at will. The means whereby these various movements are effected are, in the example illustrated, as follows.

In the example illustrated in the drawings a telescopic control pillar substantially as described in the specification accompanying my United States application Serial No. 292,166 above referred to, is employed, but modified slightly in order to actuate "balance wire" mechanism in accordance with the present invention. As shown the control-pillar whereon the drum L with its controlling hand-wheel N is supported, is constituted by two pairs of telescopic tubes 23, 23 and 24, 24, arranged side by side and provided with suitable crossheads, the drum L being mounted on a spindle 25 mounted in bearings in a crosshead 26 at the tops of the upper or slidable portions 23, 23 of the tubes so as to be rotatable in a substantially vertical plane transversely of the machine. A lower crosshead 27 on the portions 23, 23 of the tubes carries midway between the tubes a fixed nut 28 adapted to coact with a screwed rod 29 rotatable about a substantially vertical axis as one with a worm wheel 30 mounted to rotate in a bearing 31 in a crosshead 32 at the tops of the lower or fixed portions 24, 24 of the tubes, the worm wheel 30 being in mesh with a worm 33 adapted to be rotated, in bearings formed in extensions such as 34 of the crosshead 32, on a horizontal axis transverse of the pillar and provided at one end with a crank handle 35 or the like.

The respective cables or portions of cable $l^1$, $l^2$ which are wound around the drum L from opposite directions, extend thence downwardly and are led under a pair of guide-pulleys $k^1$, $k^2$ rotatably mounted in a frame 36, constituting a crosshead at the bottoms of the portions 24, 24 of the tubes, beyond which the cables $l^1$, $l^2$ are divided at points 19 and 19* (Fig. 3) into two branches which are respectively led around stationary guide-pulleys 20, 20* (Fig. 3) to each one of pairs of levers $b^1$, $b^2$ fixed to the respective ailerons $B^1$, $B^2$ and adapted to control the position of the same.

The respective cables 11, 11*, which are connected with each one of pairs of levers $e^1$, $e^2$ fixed to the lower flaps $E^1$, $E^2$ said flaps $E^1$, $E^2$ being in turn connected by pairs of cables or struts $ce$, $ce$ and $ce^*$, $ce^*$ to the flaps $C^1$ and $C^2$ respectively are attached to the crosshead 27 or an arm 37 projecting rearwardly therefrom and extend thence downwardly and are led under the pair of guide-pulleys $k^3$ and $k^4$, respectively, and thence around stationary guide-pulleys 13, 13* beyond which the cables 11 and 11* are divided at points 12 and 12* into two branches which are respectively led around stationary guide-pulleys 13 and 13* to the levers $e^1$ and $e^2$.

The respective cables $l^{1*}$, $l^{2*}$ which are connected with each one of pairs of levers $b^{2*}$, $b^{1*}$ fixed to the ailerons $B^2$, $B^1$ respectively, are wound from opposite directions around the guide-pulley L* rotatably mounted in the lower ends of rods $42^1$, $42^2$ which extend downwardly from the crosshead 27, thence the respective cables $l^{1*}$, $l^{2*}$ are led upward and over guide-pulleys $43^1$, $43^2$ rotatably mounted in downward extensions $44^1$, $44^2$ of the frame 36, thence outwardly and around stationary guide-pulleys 22*, 22 beyond which the cables $l^{1*}$, $l^{2*}$ are divided at points 21*, 21 into two branches which are respectively led around stationary guide-pulleys 22*, 22 to the levers $b^{2*}$, $b^{1*}$.

The respective cables 14, 14* which are connected with each one of pairs of levers $c^1$ $c^{1*}$ fixed to the flaps $C^1$, $C^2$ respectively as hereinbefore set forth, are connected with arms 45, 45* projecting outwardly from and carried by the lower ends of the rods $42^1$, $42^2$ aforesaid, and are thence led upward and over guide-pulleys 46, 46* (behind the pulleys $43^1$, $43^2$ in Fig. 1) rotatably mounted in the downward extensions $44^1$, $44^2$ of the frame 36 and thence outwardly and around stationary guide-pulleys 16, 16* beyond which they are divided at points 15, 15* into two branches which are respectively led around stationary guide-pulleys 16, 16* to the levers $c^1$, $c^{1*}$.

On the one hand by revolving the drum L to draw upon the cable $l^1$ and relax the cable $l^2$, the cables $l^{1*}$ and $l^{2*}$ will be simultaneously drawn upon and relaxed respectively, the pull on the cable $l^1$ will depress the starboard aileron $B^1$, the pull on the cable $l^{1*}$ will raise the port aileron $B^2$, the concurrent relaxation of the cables $l^2$ and $l^{2*}$ permitting respectively the depression of the aileron $B^1$ and the raising of the aileron $B^2$; whereas, on the other hand, by revolving the drum L to draw upon the cable $l^2$ and relax the cable $l^1$, the cables $l^{2*}$ and $l^{1*}$ will be simultaneously drawn upon and relaxed respectively, the pull on the cable $l^2$ will depress the port aileron $B^2$, the pull on the cable $l^{2*}$ will raise the starboard aileron $B^1$, the concurrent relaxation of the cables $l^1$ and $l^{1*}$ permitting respectively the depression of the aileron $B^2$ and the raising of the aileron $B^1$.

During either of these operations the cables 11, 11* and 14, 14* are unaffected.

If, on the one hand, the crank handle 35 be turned to increase the effective length of the telescopic control pillar, the drum L and the crosshead 27 will be raised as one and the cables $l^1$, $l^2$ and the cables 11, 11* will be simultaneously drawn upon to depress the ailerons $B^1$, $B^2$ and the flaps $C^1$, $E^1$, $C^2$, $E^2$ respectively.

At the same time the rods $42^1$, $42^2$ will be raised together with the pulley $L^*$ and the arms 45, 45* thus relaxing the cables $l^{1*}$, $l^{2*}$ and 14, 14* respectively and permitting the depression of said ailerons and flaps; whereas if, on the other hand, the crank handle 35 be turned to decrease the effective length of the telescopic control pillar, the drum L and the crosshead 27, will be lowered as one together with the rods $42^1$, $42^2$, the pulley $L^*$ and the arms 45, 45*, and the cables $l^{1*}$, $l^{2*}$ and 14, 14* will be simultaneously drawn upon to raise the ailerons $B^2$, $B^1$ and the flaps $C^1$, $C^2$ respectively. At the same time the cables $l^1$, $l^2$ and the cables 11, 11* will be relaxed and permit the raising of said ailerons and flaps.

It will thus be seen that the mechanical circuits are complete between the starboard and port ailerons $B^1$ and $B^2$ and between the starboard flaps $C^1$, $E^1$ and the port flaps $C^2$, $E^2$, both as regards simultaneous movement of the respective ailerons in reverse directions respectively and as regards simultaneous movement of the respective ailerons in the same direction concurrently with the corresponding movement of the flaps $C^1$, $E^1$ and $C^2$, $E^2$, as hereinbefore set forth.

It will be obvious that in all cases the arrangement should be such that the extent to which any control cable is drawn upon or relaxed should be as nearly as possible exactly equal to the extent to which the co-acting but opposed cable (which completes, or assists in completing, the mechanical circuit between the parts controlled by said cables) is relaxed or drawn upon.

I claim:—

In an aeroplane whereof the wings have trailing marginal portions of variable inclination, control cables, a control-pillar having a fixed section and a movable section, means for varying the effective length of the control-pillar, a manually-operable drum mounted to rotate on the movable section of said control-pillar, said control cables being connected with the trailing marginal portions of the respective wings and wound from opposite directions upon said manually-operable drum, balance wires, a pair of guide-pulleys mounted on said fixed section of the control-pillar, a single guide-pulley carried by said movable section of the control-pillar, said balance wires being connected with the trailing marginal portions of the respective wings and led around said pair of guide-pulleys and led from opposite directions around said single guide-pulley, said single guide-pulley being mounted on said movable section in a position relatively to said pair of guide-pulleys to decrease the distance separating the centers of the pair of guide-pulleys from the center of the single guide-pulley when the effective length of the control-pillar is increased, and vice versa.

CHARLES RICHARD FAIREY.